United States Patent Office 3,440,039
Patented Apr. 22, 1969

3,440,039
BRAZING ALLOYS
Michael Ernest Hall Watson, Birmingham, England, assignor to Joseph Lucas (Industries) Limited, Birmingham, England, a British company
No Drawing. Filed Feb. 10, 1966, Ser. No. 526,400
Claims priority, application Great Britain, Feb. 12, 1965, 6,129/65
Int. Cl. C22c 5/00
U.S. Cl. 75—134                           2 Claims

ABSTRACT OF THE DISCLOSURE

A brazing alloy has been found to be capable of use in a brazing operation at a temperature in the region 580 to 640° C., provided the alloy has the following constituency by weight, namely 39 to 46.2% silver, 27.4 to 34.9% copper, 13.2 to 17.6% indium and 9.6 to 13.6% tin.

---

This invention relates to a brazing alloy and in its broadest aspect, the invention resides in a brazing alloy consisting of tin, indium, copper and silver, the alloy being capable of being used in a brazing operation at a temperature in the region 580 to 640° C.

It has been found that the required brazing temperature can be achieved providing the following rules are observed in preparing the alloy:

(1) The ratio by weight of indium to tin must be in the range 1.1 to 1.6.
(2) The ratio by weight of silver to copper must be in the range 1.2 to 1.6.
(3) The ratio of the sum of the weights of silver and copper to the sum of the weights of tin and indium must be in the range 2.5 to 3.0.

The percentages corresponding to the above ratios are silver 39 to 46.2%, copper 27.4 to 34.9%, indium 13.2 to 17.6% and tin 9.6 to 13.6%.

The following table illustrates three suitable alloys with their percentages by weight. The ratios referred to are those specified in rules 1 to 3.

|        | Silver | Copper | Tin   | Indium | Ratio 1 | Ratio 2 | Ratio 3 | Brazing temp., (° C.) |
|--------|--------|--------|-------|--------|---------|---------|---------|------------------------|
| Ex. 1  | 44.6   | 29.75  | 12.2  | 13.45  | 1.10    | 1.50    | 2.90    | 620                    |
| Ex. 2  | 40.55  | 33.8   | 10.25 | 15.4   | 1.23    | 1.20    | 2.86    | 620                    |
| Ex. 3  | 41.0   | 31.9   | 11.3  | 15.8   | 1.40    | 1.29    | 2.69    | 600                    |

Although satisfactory results can be achieved with the ratios specified, there is a preferred restricted range within the general range in which more satisfactory results are achieved. These preferred ranges are:

Ratio 1 _____ 1.3–1.4
Ratio 2 _____ 1.3–1.4
Ratio 3 _____ 2.7–2.8

The percentages corresponding to these ratios are silver 41.3 to 43.0%, copper 30.4 to 32.1%, indium 14.8 to 15.8% and tin 10.9 to 11.8%.

The preferred alloy has the following properties the quantities being percentages by weight:

Silver _____ 42.2
Copper _____ 31.4
Tin _____ 11.5
Indium _____ 14.9
Ratio 1 _____ 1.30
Ratio 2 _____ 1.34
Ratio 3 _____ 2.79
Brazing temperature, 600° C.

The alloys described have brazing temperatures considerably below alloys using two or three of the four constituents. For example, a silver-copper alloy has a minimum brazing temperature of about 830° C., and alloys of silver and copper together with either tin or indium have a minimum brazing temperature of about 750° C. Moreover, the four constituents of the brazing alloys claimed have low vapour pressures. Thus the alloys can be used in a controlled atmosphere or a vacuum without the constituents boiling off or the components in the assembly being joined becoming contaminated. In such controlled atmospheres, the alloys need no flux. If desired the alloys may be used in air with flux.

Although the alloys being claimed can be used in the range 580 to 640° C., which is lower than other similar alloys, brazing can if necessary be effected at higher temperatures.

Having thus described my invention what I claim as new and desire to secure by Letters Patent is:

1. A brazing alloy consisting of tin, indium, silver and copper, in which the percentages by weight of the ingredients are from 39.0 to 46.2% silver, from 27.4 to 34.9% copper, from 13.2 to 17.6% indium and from 9.6 to 13.6% tin.

2. A brazing alloy as claimed in claim 1 in which the percentage of silver lies between 41.3 and 43.0%, the percentage of copper lies between 30.4 and 32.1%, the percentage of indium lies between 14.8 and 15.8%, and the percentage of tin lies between 10.9 and 11.8%.

References Cited

UNITED STATES PATENTS 2,456,594  12/1948  Polak _____ 75—134
2,503,564  4/1950   Reeve _____ 75—134
2,950,189  8/1960   Ames _____ 75—173

RICHARD O. DEAN, *Primary Examiner.*

U.S. Cl. X.R.

75—154, 173